UNITED STATES PATENT OFFICE.

CHARLES O. NEWTON, OF HOMER, NEW YORK.

MAKING HASH.

SPECIFICATION forming part of Letters Patent No. 464,517, dated December 8, 1891.

Application filed October 24, 1889. Renewed July 25, 1891. Serial No. 400,679. (No specimens.)

*To all whom it may concern:*

Be it known that I, CHARLES O. NEWTON, residing at Homer, in the county of Cortland and State of New York, have invented certain new and useful Improvements in Method of Making and Preserving Hash, of which the following is a specification.

This invention relates to an improvement in the art or process of preparing a food product known as "hash."

The object of the invention is to prepare hash, preferably from potatoes and corned beef, with or without seasoning or flavoring, in which the essential essences of the meat will be preserved, and which will be firm and attractive in appearance, and which may be canned or hermetically sealed and thus preserved for a long time. In the ordinary process of preparing hash the potatoes and meat are cooked separately, and are then chopped or otherwise comminuted, then mixed and stirred together, and again heated or stewed together, the flavoring or seasoning being added during this stewing process. In my method of preparing hash I take raw potatoes, slice them to a suitable thickness, and dry or desiccate them. I then chop or otherwise comminute the desiccated potatoes and mix the raw chopped potatoes with a suitable quantity of chopped corned beef in a raw state. In preparing the corned beef the large pieces may be taken from the brine, washed, and then hung up in a place where there is a circulation of warm dry air until the external moisture is evaporated. The chopping should be done with a sharp knife, so that the meat is cut and not mashed. The mixed potatoes and beef are then put in a closed pan or other suitable vessel and baked in a hot oven until the potatoes are thoroughly cooked. When quite done, the hash is removed from the pan and placed in cans. A proper seasoning of pepper, spices, and, if desired, onions or other vegetables, such as grated celery, &c., may be added. The cans are then heated to expel the air and hermetically sealed. The cans are then ready for labeling and shipment. The advantage of desiccating the potatoes is that the dry particles have an avidity for moisture, and when brought in contact with the beef immediately begin to absorb the juices therefrom. As the beef is uncooked at the time of cutting, the particles or pieces retain their shape and firmness, as would not be the case if the cooking were done before the chopping. When cut in this way and mixed with potatoes, the corned beef shows a rich color, and does not mash together as it would after cooking. When thus baked together, the dry potatoes absorb about all the moisture and much of the flavor and nutriment of the beef, so that nothing is lost in the cooking. The food product is more palatable and nutritious than if a part of the juices were lost in cooking and the flavor allowed to pass off with the steam. The baking in a closed or nearly closed vessel allows any needful degree of heat to be applied. The steam driven from the meat will be at once absorbed, to a very great extent, at least, by the dry potatoes, and the hash when cooked presents an appetizing appearance.

What I claim is—

The method of preparing hash, which consists in desiccating and comminuting potatoes, then mixing them in a raw state with chopped meat also raw, and then baking the mixture until thoroughly cooked, substantially as described.

In testimony whereof I affix my signature in presence of two witnesses.

CHARLES O. NEWTON.

Witnesses:
WM. D. BROOKS,
VERNON T. STONE.